(12) United States Patent
Hirose

(10) Patent No.: US 12,264,923 B2
(45) Date of Patent: Apr. 1, 2025

(54) INFORMATION PROVIDING APPARATUS, INFORMATION PROVIDING METHOD, AND PROGRAM

(71) Applicant: PIONEER CORPORATION, Tokyo (JP)

(72) Inventor: Chihiro Hirose, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 223 days.

(21) Appl. No.: 16/651,328

(22) PCT Filed: Sep. 21, 2018

(86) PCT No.: PCT/JP2018/034998
§ 371 (c)(1),
(2) Date: Mar. 26, 2020

(87) PCT Pub. No.: WO2019/065486
PCT Pub. Date: Apr. 4, 2019

(65) Prior Publication Data
US 2020/0225050 A1 Jul. 16, 2020

(30) Foreign Application Priority Data
Sep. 29, 2017 (JP) ................................. 2017-191848

(51) Int. Cl.
G01C 21/34 (2006.01)
G01C 21/36 (2006.01)
G10L 15/22 (2006.01)

(52) U.S. Cl.
CPC ..... *G01C 21/3446* (2013.01); *G01C 21/3605* (2013.01); *G10L 15/22* (2013.01); *G10L 2015/223* (2013.01)

(58) Field of Classification Search
CPC . G01C 21/3446; G01C 21/3605; G10L 15/22; G10L 2015/223
See application file for complete search history.

(56) References Cited

U.S. PATENT DOCUMENTS 9,516,529 B2 * 12/2016 Tzannes .................. H04W 4/80
10,902,848 B2 * 1/2021 Sohn ...................... G06F 21/32
(Continued)

FOREIGN PATENT DOCUMENTS

JP 2001056225 A 2/2001
JP 4664524 A 11/2002
(Continued)

OTHER PUBLICATIONS

Office action dated Feb. 24, 2021 in counterpart JP Patent Application No. 2019-545052, 7 pages.
(Continued)

*Primary Examiner* — Bailor C Hsu
(74) *Attorney, Agent, or Firm* — Procopio Cory Hargreaves & Savitch LLP

(57) ABSTRACT

The information providing apparatus according to the present invention is an information providing apparatus which can be installed in a plurality of moving bodies, and comprises: a movement related information acquisition unit configured to acquire movement related information which is information relating to movement of one moving body and which is information stored in association with the one moving body; a moving body-identifying information acquiring unit configured to acquire moving body-identifying information which is information useful for identifying a moving body in which the information providing apparatus is currently installed; an information output unit configured to output provision information based on the movement related information associated with the one moving body.

7 Claims, 13 Drawing Sheets

(56) References Cited

U.S. PATENT DOCUMENTS

| | | | | |
|---|---|---|---|---|
| 2005/0128106 | A1* | 6/2005 | Nakaishi | G01C 21/3629 340/988 |
| 2006/0074552 | A1* | 4/2006 | Naito | G01C 21/3629 340/995.19 |
| 2007/0050191 | A1* | 3/2007 | Weider | G10L 15/1815 704/E15.04 |
| 2007/0136069 | A1* | 6/2007 | Veliu | G10L 15/065 704/E15.009 |
| 2009/0248419 | A1* | 10/2009 | Spaulding | G10L 15/22 704/E11.001 |
| 2010/0097178 | A1* | 4/2010 | Pisz | G07C 9/28 340/5.72 |
| 2010/0198497 | A1* | 8/2010 | Okuno | G01C 21/36 701/533 |
| 2010/0324818 | A1 | 12/2010 | Gellatly et al. | |
| 2012/0245934 | A1* | 9/2012 | Talwar | G10L 15/22 704/E15.005 |
| 2014/0129132 | A1* | 5/2014 | Yoshizu | G01C 21/362 701/400 |
| 2014/0309866 | A1* | 10/2014 | Ricci | G06F 21/32 701/36 |
| 2014/0322676 | A1* | 10/2014 | Raman | G09B 19/167 434/65 |
| 2014/0365068 | A1 | 12/2014 | Burns et al. | |
| 2015/0170653 | A1* | 6/2015 | Berndt | G10L 15/22 704/275 |
| 2015/0271452 | A1* | 9/2015 | Guzman | H04N 1/00116 348/113 |
| 2016/0104486 | A1* | 4/2016 | Penilla | G10L 15/25 704/232 |
| 2016/0334228 | A1* | 11/2016 | Wang | G01C 21/3691 |
| 2017/0120888 | A1* | 5/2017 | Jinno | B60L 53/00 |
| 2017/0140757 | A1 | 5/2017 | Penilla et al. | |
| 2017/0341578 | A1* | 11/2017 | Sherony | G08G 1/165 |
| 2018/0013873 | A1* | 1/2018 | Farrell | H04W 76/10 |
| 2019/0304213 | A1* | 10/2019 | Chen | G07C 5/0833 |
| 2020/0387629 | A1* | 12/2020 | Yang | G10L 15/1822 |

FOREIGN PATENT DOCUMENTS

| | | |
|---|---|---|
| JP | 2007057375 A | 3/2007 |
| JP | 2009250703 A | 10/2009 |
| JP | 2010204070 A | 9/2010 |

OTHER PUBLICATIONS

Office Action dated Sep. 14, 2021 in counterpart JP Patent Application No. 2019-545052, 8 pages.
International Search Report for PCT—JP App. No. 2018034998; 2 pages (dated Nov. 20, 2018).
Extended European Search Report dated Jul. 22, 2021 from corresponding EP Patent Application No. 18860111.6, 11 pages.
Office Action received in corresponding EP Application No. EP 18 860 111.6, dated Mar. 3, 2023, in 8 pages.
Notice of Rejection received in corresponding JP Application No. 2022-208042, dated Feb. 20, 2024, in 6 pages, with translation.
Office Action received in corresponding EP Application No. 18 860 111.6, dated Oct. 10, 2024, in 8 pages, with translation.

* cited by examiner

AGENT TERMINAL ID: YYYY

| IN-VEHICLE DEVICE ID | TONE | SPEAKING PACE |
|---|---|---|
| □□□□ | MALE | SLOW |
| ××× | FEMALE | FAST |

AGENT TERMINAL ID: YYYY

| IN-VEHICLE DEVICE ID | VEHICLE DATA | MAINTENANCE INSPECTION DATA | TRAVEL DATA |
|---|---|---|---|
| □□□□ | MODEL: ○○○○ | INSPECTION DATE: 2017/9/30 | TRAVEL HISTORY 1 |
| ××××  | MODEL: △△△△ | INSPECTION DATE: 2018/10/30 | TRAVEL HISTORY 2 |

AGENT TERMINAL ID: YYYY

| VEHICLE IDENTIFIER | IN-VEHICLE DEVICE ID | VEHICLE DATA | MAINTENANCE INSPECTION DATA | TRAVEL DATA |
|---|---|---|---|---|
| BILL | □□□□ | MODEL: ○○○○ | INSPECTION DATE: 2017/9/30 | TRAVEL HISTORY 1 |
| JENNIFER | ××××  | MODEL: △△△△ | INSPECTION DATE: 2018/10/30 | TRAVEL HISTORY 2 |

AGENT TERMINAL ID: YYYY

| VEHICLE IDENTIFIER | IN-VEHICLE DEVICE ID | TONE | SPEAKING PACE |
|---|---|---|---|
| BILL | □□□□ | MALE | SLOW |
| JENNIFER | × × × × | FEMALE | FAST |

INFORMATION PROVIDING APPARATUS, INFORMATION PROVIDING METHOD, AND PROGRAM

CROSS-REFERENCE TO RELATED APPLICATIONS

This application is a U.S. National Stage entry of PCT Application No. PCT/JP2018/034998, filed on Sep. 21, 2018, which claims priority to JP Application No. 2017-191848, filed Sep. 29, 2017, the contents of the foregoing are incorporated by reference.

TECHNICAL FIELD

The present invention relates to an information providing apparatus and, more particularly, to an information providing apparatus, an information providing method and a program for providing information to a passenger of a moving body when the information providing apparatus is installed in a moving body.

BACKGROUND ART

Conventionally, there has been proposed an agent terminal which authenticates an individual who uses a vehicle and which performs a response to the authenticated individual by using agent data corresponding to each individual (Patent Literature 1).

CITATION LIST

Patent Literature

Patent Literature 1: Japanese Patent Publication Laid-Open No. 2016-213732.

SUMMARY OF INVENTION

Technical Problem

By the agent terminal disclosed in Patent Literature 1, it is possible to perform an appropriate response for each individual by learning preferences of each individual in association with each individual who uses a vehicle. However, when one agent terminal can be installed in a plurality of different vehicles, there is an example of a problem that it is difficult to make an appropriate response for occupants in each of different vehicles.

The present invention has been made in view of the above problems, and an object of the present invention is to provide an information providing apparatus, an information providing method, and an information providing program which are capable of performing appropriate information providing or responding for occupants in each of moving bodies when the information providing apparatus is installed in different moving bodies.

Solution to Problem

An exemplary aspect of the present application is directed to an information providing apparatus which comprises:
  a movement related information acquisition unit configured to acquire movement related information which is information relating to movement of one moving body and which is information stored in association with said one moving body;
  a moving body identifying information acquiring unit configured to acquire moving body identifying information which is information useful for identifying a moving body in which said information providing apparatus is currently installed; and,
  an information output unit configured to output provision information based on said movement related information associated with said one moving body when said one moving body is identified by using said moving body identifying information.

Another exemplary aspect of the present application is directed to method of providing information by using an information providing apparatus which comprises:
  a step of acquiring by said information providing apparatus movement related information which is information relating to movement of one moving body and which is information stored in association with said one moving body;
  a step of acquiring by said information providing apparatus moving body identifying information which is information useful for identifying a moving body in which said information providing apparatus is currently installed; and,
  a step of outputting by said information providing apparatus provision information based on said movement related information associated with said one moving body when said one moving body is identified by using identifying information.

Another exemplary aspect of the present application is directed to an information providing program executed by an information providing apparatus, said program comprising:
  a step of acquiring movement related information which is information relating to movement of one moving body and which is information stored in association with said one moving body;
  a step of acquiring moving body identifying information which is information useful for identifying a moving body in which said information providing apparatus is currently installed;
  a step of outputting provision information based on said movement related information associated with said one moving body when said one moving body is identified by using said moving object identifying information.

BRIEF DESCRIPTION OF DRAWINGS

FIG. 4A is a diagram illustrating an example of a vehicle information table, FIG. 4B is a diagram illustrating another example of the vehicle information table, FIG. 9A is a diagram illustrating another example of the vehicle information table, FIG. 9B is a diagram illustrating another example of the vehicle information table.

DESCRIPTION OF EMBODIMENTS

First Embodiment

[1. A Configuration and an Operation of a System]

Figure 1:
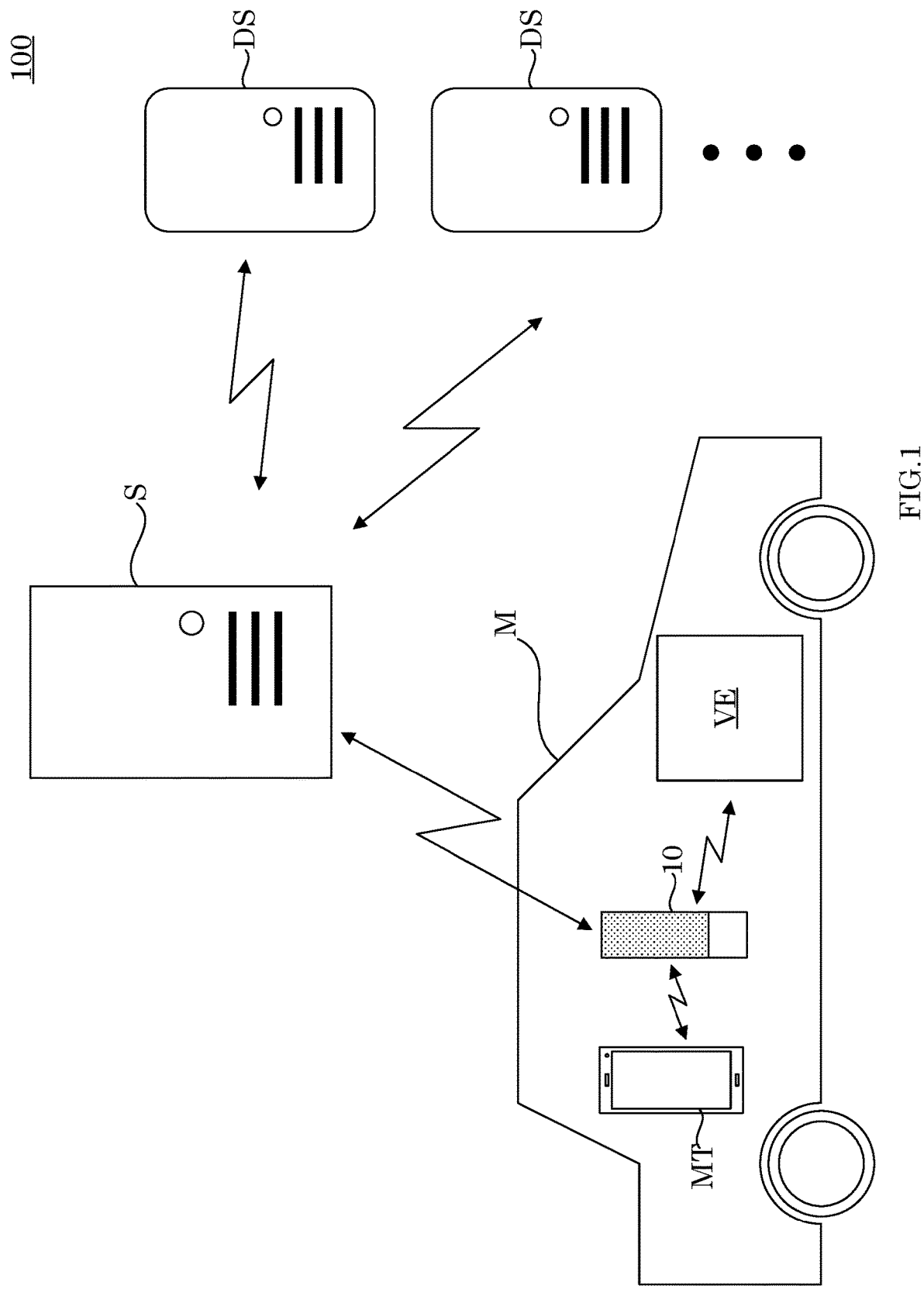
FIG. 1 is a diagram of a system including an agent terminal of a first embodiment of the present invention.

An information providing system 100 including an agent terminal 10 as an information providing apparatus, and an information providing method which are shown as a first embodiment of the present invention will be described below with reference to the accompanying drawings. FIG. 1 shows the information providing system 100 including the agent terminal 10 of the first embodiment of the present invention. Specifically, the agent terminal 10 is a terminal having a function of a smart speaker, for example.

As shown in FIG. 1, the information providing system 100 includes the agent terminal 10 and a server S (an example of a "server device"). FIG. 1 shows a case where the agent terminal is installed in an automobile M as an example of a moving body.

An in-vehicle device or on-board unit VE is a device such as a car stereo equipment installed in the automobile M. The in-vehicle device VE has a unique device identifier (hereinafter, also referred to as an in-vehicle device ID). The unique device identifier may be, for example, a MAC address and so on. In the following description, it is assumed that the in-vehicle device VE is permanently installed in the automobile M. Therefore, it is assumed that the device identifier of the in-vehicle device VE can be treated equally with the identifier of the automobile M itself. A user terminal MT is a mobile terminal such as a smartphone carried by a user who got in the automobile M.

The agent terminal 10 and the server S are capable of transmitting and receiving data to and from each other by using a communication protocol such as TCP/IP via a network (communication path). Further, the server S is capable of transmitting to and receiving data from other servers DS such as an agent server capable of performing a reservation process of hotel facilities and so on, by using a communication protocol such as TCP/IP. The network may be constructed by, for example, an Internet communication including a wireless communication such as a mobile communication network, Wi-Fi (registered trademark) and so on and a wired communication.

The agent terminal 10 can be communicably connected to the in-vehicle device VE and the user terminal MT via the wireless communication such as Wi-Fi (registered trademark) or Bluetooth (registered trademark) or via the wired communication.

Figure 2:
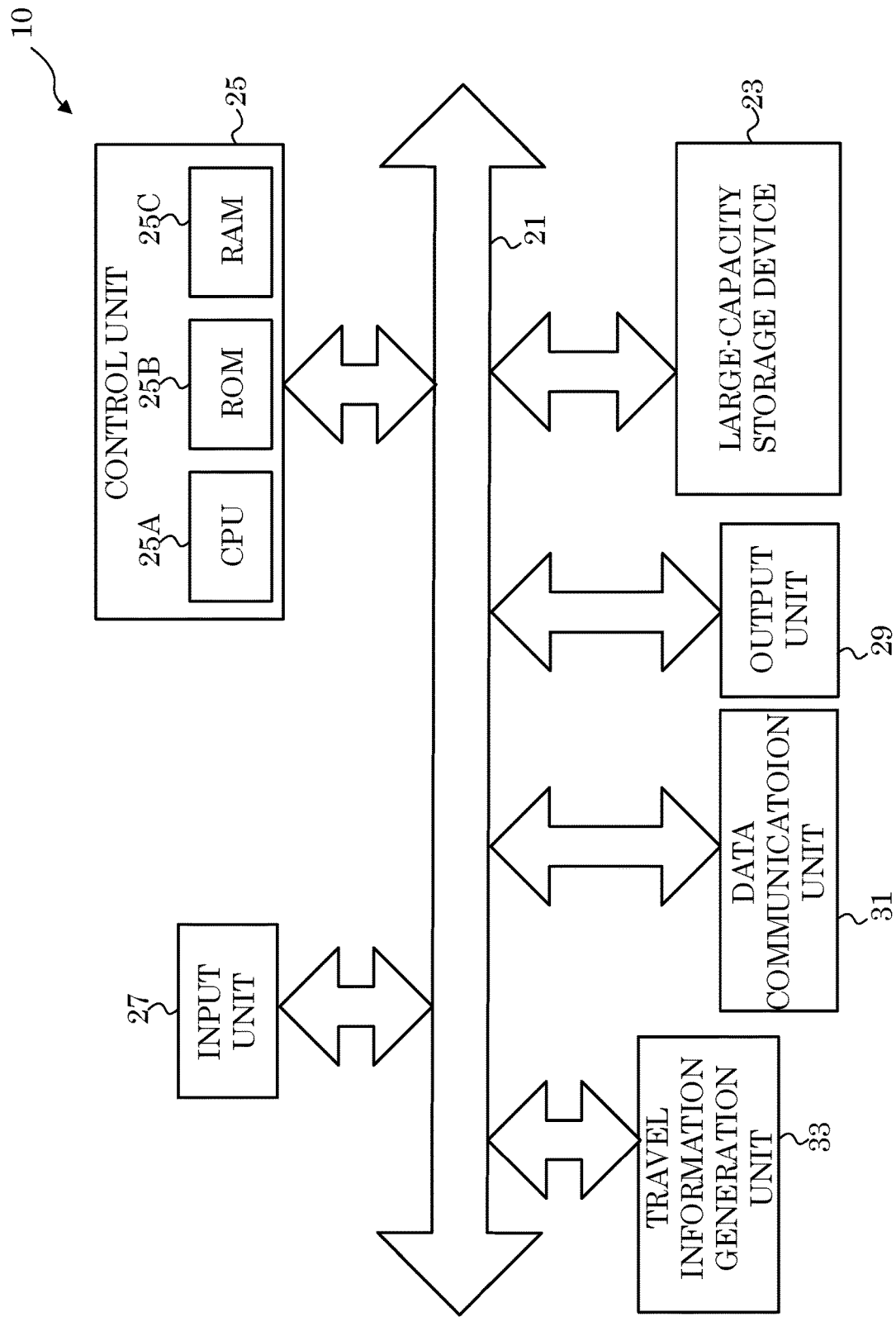
FIG. 2 is a block diagram showing an example of the configuration of the agent terminal in the system of FIG. 1.

FIG. 2 shows a configuration of the agent terminal 10. For example, the agent terminal 10 is a device in which a large-capacity storage device 23, a control unit 25, an input unit 27, an output unit 29, a data communication unit 31, and a travel information generation unit 33 cooperate with each other via a system bus 21.

The large-capacity storage device 23 is constituted by, for example, a hard disk drive, an SSD (solid state drive), a flash memory and so on, and stores various programs such as an operating system and software for a terminal. The various programs may be acquired from another server apparatus and so on via the network, or may be recorded on a recording medium and read through various drive apparatuses. That is, the various programs (including a program for executing processing in the agent terminal 10 of processing described later) stored in the large-capacity storage device 23 can be transmitted via the network, and can be recorded to a computer-readable recording medium and transferred.

The control unit 25 includes a CPU (Central Processing Unit) 25A, a ROM (Read Only Memory) 25B, a RAM (Random Access Memory) 25C, and so on, and functions as a computer. The CPU 25A reads and executes various programs stored in the ROM 25B and the large-capacity storage device 23, thereby realizing various functions.

The input unit 27 is a sound input device such as a microphone provided in the agent terminal 10. Based on a voice input from the input unit 27, the control unit 25 can generate voice information. The input unit may include, for example, an input device such as a touch panel and a stylus pen.

The output unit 29 as an information output unit is a sound output unit such as a speaker provided in the agent terminal 10. The output unit 29 may include, for example, a display provided in the agent terminal 10.

The output unit 29 can output a sound based on the data transmitted from the server apparatus S. When the output unit 29 includes a display, the output unit 29 can display an image based on data transmitted from the server apparatus S.

The data communication unit 31 is connected to the network described above, and transmits and receives various data to and from other devices such as the server S. The data communication unit 31 can communicate with the in-vehicle device VE and the user terminal MT by the wireless communication such as Wi-Fi (registered trademark) or Bluetooth (registered trademark) as described above or by the wired communication.

For example, the agent terminal 10 can communicates with the in-vehicle device VE in the automobile M, in which the agent terminal 10 is installed, via the data communication unit 31, and to acquire the device identifier of the in-vehicle device VE. As described above, the device identifier of the in-vehicle device VE can be regarded as an identifier of the automobile M in which the in-vehicle device VE is installed. Therefore, the agent terminal 10 is able to obtain information useful for identification of the automobile M in which the agent terminal 10 is currently installed, by communication with the in-vehicle device VE by the data communication unit 31.

Further, the agent terminal 10 can transmit voice information, which is generated by the control unit 25 based on a voice input of the input unit 27, to the server S.

The agent terminal 10 can communicate with the user terminal MT and can use the user terminal MT as an alternative to the input unit 27 or the output unit 29.

The travel information generation unit 33 serving as a movement related information acquisition unit or a moving body information acquisition unit includes, for example, a position specifying device such as a GPS (Global Positioning System) device, an acceleration sensor, and a gyro sensor, and can generate travel related information that is information concerning travel of the automobile M. The position specifying device included in the traveling information generating unit 33 may be any device capable of specifying the position of the agent terminal 10 and thus the automobile M, and may be another position specifying device such as an device capable of specifying a position based on neighbor base station or base stations of a cellular phone network. The travel information generating unit 33 can generate travel related information including position specifying information that can specify the position of the agent terminal 10, moving speed information, or acceleration information. The travel related information may include information concerning driving operation. In order to obtain information concerning the driving operation, the traveling information generating unit 33 may detect operation of the steering wheel, accelerator pedal or brake pedal of the automobile M, for example, by communication with equipment installed in the automobile M.

The agent terminal 10 can transmit the travel related information generated by the travel information generation unit 33 to another device including the server S by the data communication unit 31.

Figure 3:
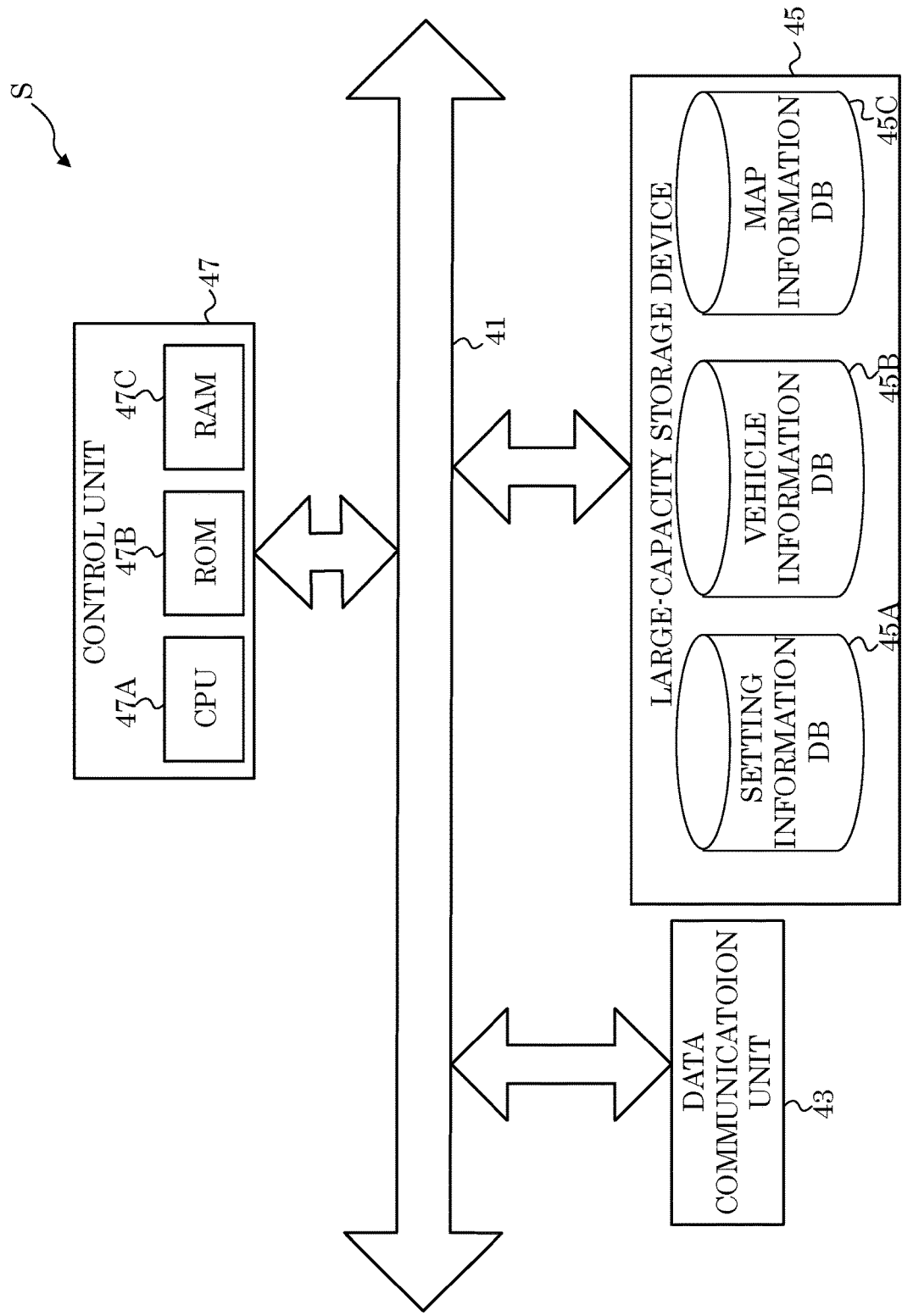
FIG. 3 is a block diagram showing an example of the configuration of a server in the system of FIG. 1.

FIG. 3 shows a configuration of the server S. For example, the server S is a device in which a data communication unit 43, a large-capacity storage device 45 and a control unit 47 cooperate with each other via a system bus 41.

The data communication unit 43 is connected to the network described above, and transmits and receives various data to and from other devices such as the agent terminal 10 and the other servers DS. The data communication unit 43 is capable of receiving the travel related information including the position specifying information capable of specifying the position of the agent terminal 10 from the agent terminal 10. The data communication unit can receive the voice information generated by the agent terminal 10 based on voice input to the input unit of the agent terminal 10.

The large-capacity storage device 45 is configured by, for example, a hard disk drive and an SSD (solid state drive), and stores various programs such as an operating system, a software for a server, and so on.

large-capacity storage device 45 stores vehicle information including device identifiers of in-vehicle devices VE of one or more automobiles M in each of which the agent terminal 10 is installed, and a vehicle type, a vehicle inspection date, travel data and the like of each of the one or more automobiles M linked (associated) to each of the device identifiers of the in-vehicle devices VE. The large-capacity storage device 45 stores setting information including a tone of voice and a speaking pace concerning a voice sound emitted from the agent terminal 10 when it is installed in the automobile M, based on the voice information transmitted from the server S.

The above-mentioned vehicle information is stored in a vehicle information database (referred to as a vehicle information DB in the FIG. 45A in the large-capacity storage device 45. The above-mentioned setting information is stored in a setting information database (shown as setting information DB in the FIG. 45B in the large-capacity storage device 45.

The large-capacity storage device 45 also includes a map information database (shown as map information DB in the FIG. 45C in which map information including a road map is stored. The map information of the map information database 45C is a database having information equivalent to map information used for a navigation device, for example.

The control unit 47 includes a CPU (Central Processing Unit) 47A, a ROM (Read Only Memory) 47B, a RAM (Random Access Memory) 47C, and so on, and functions as a computer. The CPU 47A reads and executes various programs stored in the ROM 47B and the large-capacity storage device 45, thereby realizing various functions.

In the present embodiment, a conversation type AI application program is stored in the large-capacity storage device 45 or the ROM 47. Therefore, the control unit 47 can execute the stored conversation type AI application program and behave as an AI conversation robot.

Specifically, for example, the control unit 47 may interpret the contents of voice information or voice data transmitted from the agent terminal, and generate a reply sound when the voice information or data represent an inquiry. Also, under a predetermined condition or situation, the control unit 47 may generate a voice to be spoken regardless of whether or not an inquiry is made. The control unit 47 uses the database including the vehicle information database 45B and the map information database 45C as a knowledge base in the generation of the reply or speaking voice or sound. That is, the control unit 47 can function as a conversation robot using the vehicle information database 45B and the map information database 45C as a knowledge base.

In the present embodiment, the agent terminal 10 can use only information associated with the automobile M currently installed with the agent terminal 10, in the information stored in the vehicle information database 45B.

The large-capacity storage device 45 may include a database other than the vehicle information database 45B and the map information database 45C as a knowledge base. Further, a database in another server DS communicably connected to the server S may be used as a knowledge base.

In the case where the control unit 47 interprets the contents of the voice information transmitted from the agent terminal 10, if the voice is a certain instruction, the control unit 47 may perform a function according to the instruction.

In the present embodiment, a car navigation program is stored in the large-capacity storage device 45 or the ROM 47B. Therefore, the control unit 47 can execute the stored car navigation program and behave as a car navigation device. For example, when the voice information transmitted from the agent terminal 10 is an instruction for requiring a car navigation function, the control unit 47 may provide the car navigation function by using the car navigation program and the map information database 45C.

FIG. 4A shows an example of a setting information table TB1 stored in the setting information database 45A. The setting information table TB1 is created for each agent terminal 10. An ID of an agent terminal 10 is described in the upper left of the setting information table TB1.

In the setting information table TB1, device identifiers of registered in-vehicle devices VE are listed under a field of the in-vehicle device ID. In a field of a tone, the tone of voice which is used when the agent terminal 10 is installed in an automobile M in which a specific in-vehicle device is installed is described. In addition, in a speaking pace field, a speaking pace which is used when the agent terminal 10 is installed in the automobile M in which the specific in-vehicle device is installed.

When the control unit 47 of the server S functions as the AI conversation robot described above, conversation voice is generated based on the tone of voice and the speaking pace described in association with the device identifier of the in-vehicle device VE in the setting information table TB1.

The information about the tone of voice and the speaking pace included in the setting information table TB1 can be set and saved by the user when the agent terminal 10 is installed in an automobile M that has not yet been registered, that is, in an automobile M in which the agent terminal 10 is installed for the first time. The contents of this setting may be input through the input unit 27 of the agent terminal 10 or through the mobile terminal MT capable of communicating with the agent terminal 10. The contents of the setting may be stored in the setting information database 45A by transmitting the input setting contents to the server S.

FIG. 4B shows an example of a vehicle information table TB2 stored in the vehicle information database 45B. The vehicle information table TB2 is created for each agent terminal 10. The ID of an agent terminal 10 is described on the upper left side of the vehicle information table TB2.

In the vehicle information table TB2, device identifiers of registered in-vehicle devices VE are listed under a field of an in-vehicle device ID. In a field of the car model, for example, vehicle data including vehicle information such as the model name of an automobile M in which an in-vehicle device VE is installed, maintenance inspection data including maintenance inspection information such as an inspection date of the automobile M, and travel data including a travel history of the automobile M are recorded.

The vehicle information may include, in addition to a model name of the automobile M or instead of the model name, information such as a type of fuel used for the automobile M, a riding capacity, a right/left handle, and a vehicle size of the automobile M. The maintenance and inspection information of the automobile M may include information such as an oil change date or a wiper replacement date.

The vehicle information included in the vehicle information table TB2 can be input by a user and stored when the agent terminal 10 is installed in an automobile M, for example, in which the agent terminal 10 is not yet registered. The vehicle information may be input through the input unit 27 of the agent terminal 10 or through the mobile terminal MT capable of communicating with the agent terminal 10. Further, the vehicle information may be stored in the vehicle information database 45B by transmitting the input vehicle information to the server S.

The travel history may include, for example, a departure point, an arrival point, and a stopover point of the automobile M, a travel route of the automobile M, a travel speed, and an acceleration history of the automobile M. The information included in the travel history may be generated, for example, based on the travel related information transmitted from an agent terminal 10 when the agent terminal 10 is installed in the automobile M and the map information stored in the map information database 45C. The travel data can be constantly updated while the agent terminal 10 is installed in the automobile M.

[2. Control Routine]

A control routine for implementing a system including the method of the first embodiment, the agent terminal 10 and server S will be described below. A broken line in a diagram of the routine used in the following description schematically shows transmission/reception of a notification or data, etc. between the agent terminal 10 and the server S.

[2-1. Travel Data Recording Routine].

Figure 5:
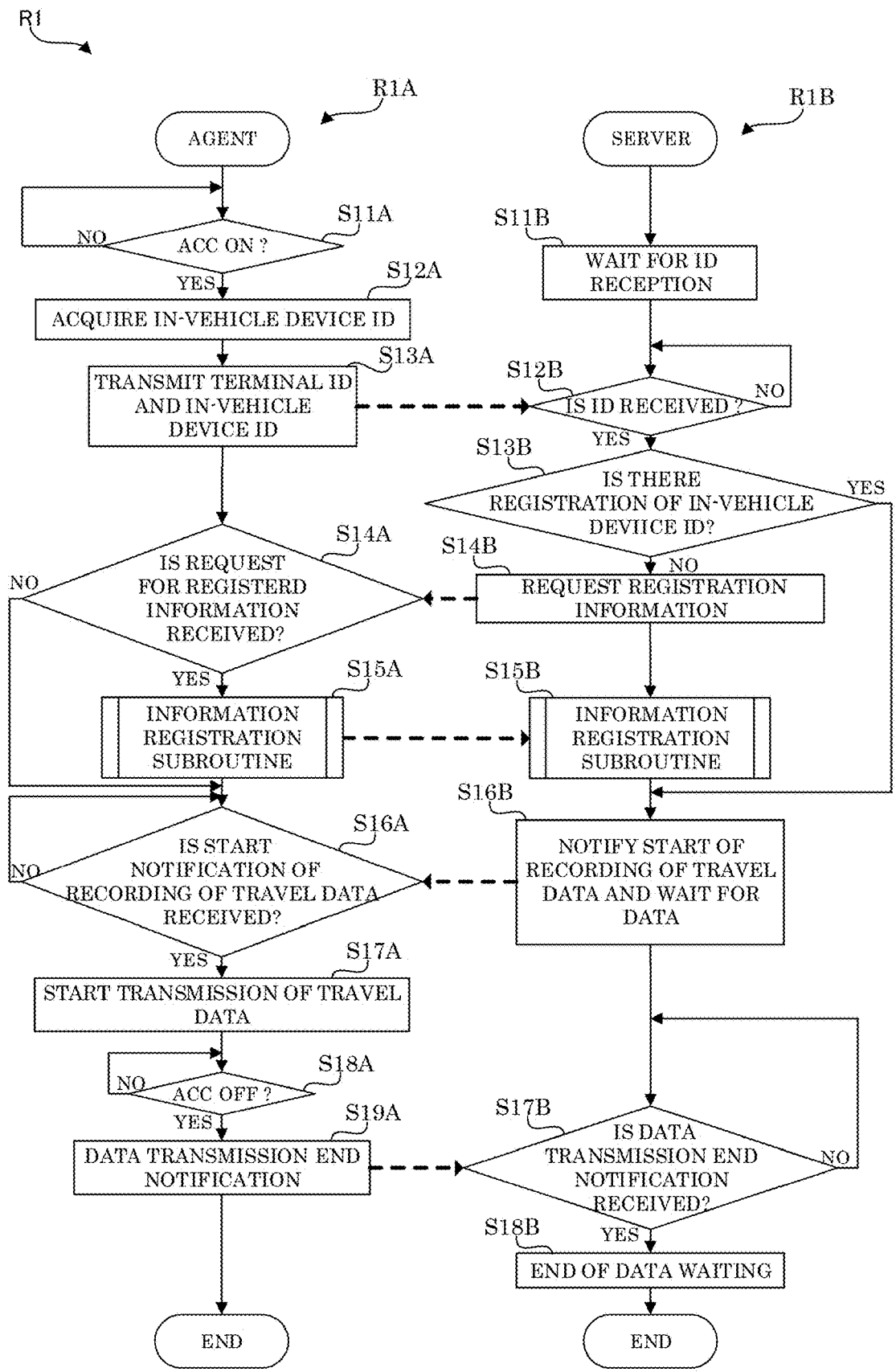
FIG. 5 is a flowchart of an operation routine for implementing a system including the agent terminal of the first embodiment of the present invention.

FIG. 5 shows a travel data recording routine R1 executed by an agent terminal 10 and the server S when a user brings the agent terminal 10 into an automobile M, that is, when the agent terminal 10 is installed in the automobile M. A routine executed by the agent terminal 10 is represented by R1A, and a routine executed by the server S is represented by R1B.

For example, the routines R1A and R1B may be started when the agent terminal 10 and the server S are activated, and then be repeatedly executed.

When the control unit 25 of the agent terminal 10 (hereinafter simply referred to as "agent terminal 10" in the description of the routine) starts the routine R1A, it first determines whether or not an accessory power supply (hereinafter referred to as ACC power supply) of the automobile M installed is turned on (step S11A). This determination may be made by the agent terminal 10 attempting to establish communication with the in-vehicle device VE. That is, when the communication is established, it is determined that the in-vehicle device VE is powered on, and that the ACC power supply is turned on. If the communication is not established, it is determined that the power supply of the in-vehicle device VE is not turned on, and that the ACC power supply is not turned on.

In step S11A, when it is determined that the ACC power supply is not turned on (step S11A: NO), monitoring of the ACC power supply is continued. In step S11A, when it is determined that the ACC power supply is turned on (step S11A: YES), the device identifier (in-vehicle device ID) of the in-vehicle device VE is acquired (step S12A). In other words, in step S12A, the control unit 25 functions as a moving body identifying information acquiring unit. When the step S12A is finished, the terminal identifier (terminal ID) of the agent terminal 10 and the in-vehicle device ID of the acquired in-vehicle device VE are transmitted to the server S (step S13A).

When the control unit 47 of the server S starts the routine R1B, the control unit 47 first waits for reception of the terminal ID of the agent terminal 10 and the in-vehicle device ID (step S11B). Thereafter, in step S12B, it is determined whether or not the terminal ID and the in-vehicle device ID transmitted in step S13A are received (step S12B).

When it is determined in step S12B that the terminal ID and the in-vehicle device ID have not yet been received (step S12B: NO), the reception of these IDs is waited for a predetermined period of time, and step S12B is executed again.

When it is determined in step S12B that the terminal ID and the in-vehicle device ID are received (step S12B: YES), it is determined whether or not a combination of the received terminal ID and in-vehicle device ID is registered in the setting information database 45A and the vehicle information database 45B (step S13B). This determination can be made based on whether there is a table with the received terminal ID in the setting information table TB1 of the setting information database 45A and the vehicle information table TB2 of the vehicle information database 45B, and whether the received in-vehicle device ID is described in the table.

In step S13B, when it is determined that the in-vehicle device VE is not registered (step S13B: NO), the server S requests registration information including setting information and vehicle information to the agent terminal 10 (step S14B), and thereafter, a server side information registration subroutine is executed (step S15B). In this server side information registration subroutine, setting information and vehicle information relating to conversation voices such as a tone of voice and a speaking pace are received from the agent terminal 10, and these pieces of information are stored in association with the in-vehicle device ID of the in-vehicle device VE registered at this time. In the subsequent processing, information transmitted from the agent is stored in association with the registered in-vehicle device ID stored in step S15B.

In step S13B, when it is determined that the in-vehicle device VE is registered (step S13B: YES), the information transmitted from the agent terminal 10 in the subsequent processing is stored in association with the registered in-vehicle device VE.

After the end of step S13A, the agent terminal 10 determines whether or not a request for registration information to be transmitted in step S14B of the server S side has been received (step S14A). This determination may be made by whether or not the request for the registration information is received within a predetermined period of time after the end of step S13A.

When it is determined in step S14A that the registration information request has been received (step S14A: YES), an agent side information registration subroutine is executed (step S15A). In the agent side information registration subroutine, the agent terminal 10 receives the setting information concerning a tone of voice and a speaking pace, and the like, and the vehicle information input by users, and transmits the information to the server S. In step S14A, when it is determined that the registration information request has not been received (step S14A: NO), step S16A is executed.

After the end of the subroutine in step S15B, the server S transmits to the agent terminal 10 a notification of start of recording of travel data, and waits for reception of data used for recording the travel data (step S16B).

After the end of the subroutine in step S15A, the agent terminal 10 determines whether or not the start notification of the recording of the travel data has been received (step S16A). This determination may be made by determining whether or not the start notification of the recording of the travel data is received within a predetermined period of time after the end of the step S15A.

When it is determined in step S16A that the start notification of the recording of the travel data is received (step S16A: YES), for example, transmission of the travel data including travel related information of the agent terminal 10 toward the server S is started (step S17A). The transmission of the travel data may be carried out continuously, or discontinuously or intermittently at a constant time interval or at an irregular time interval. In step S16A, the transmitted data is received by the server S, and is stored in the vehicle information database 45B in association with the in-vehicle device ID.

In step S16A, when it is determined that the start notification of the recording of the travel data is not received (step S16A: NO), step S16A is executed again after the predetermined period of time.

After step S17A, it is determined in step S18A whether or not the ACC power supply of the automobile M is turned off. This determination may be made by the agent terminal 10 attempting to establish communication with the in-vehicle device VE. That is, when the communication is established, it is determined that the power supply of the in-vehicle device VE is turned on and that the ACC power supply is not turned off. When the communication is not established, it is determined that the power supply of the in-vehicle device VE is turned off, and that the ACC power supply is turned off.

When it is determined in step S18A that the ACC power supply is not turned off (step S18A: NO), the transmission of the travel data (step S17A) is continued, and step S18A is executed again after a predetermined period of time.

When it is determined in step S18A that the ACC power supply is turned off (step S18A: YES), a data transmission end notification notifying termination or end of data transmission is transmitted to the server S (step S19A), and the routine R1A is ended.

After the end of step S16B, the server S determines whether or not the data transmission end notification that the agent terminal 10 transmits in step S19A has been received (step S17B). In step S17B, when it is determined that the data transmission end notification is not received (step S17B: NO), waiting for the reception of the travel data is continued (step S16B), and then step S17B is executed again.

When it is determined in step S17B that the data transmission end notification is received (step S17B: YES), the data reception waiting is ended (step S18B), and then the routine R1B is ended.

[2-2. Information Registration Subroutine]

Figure 6:
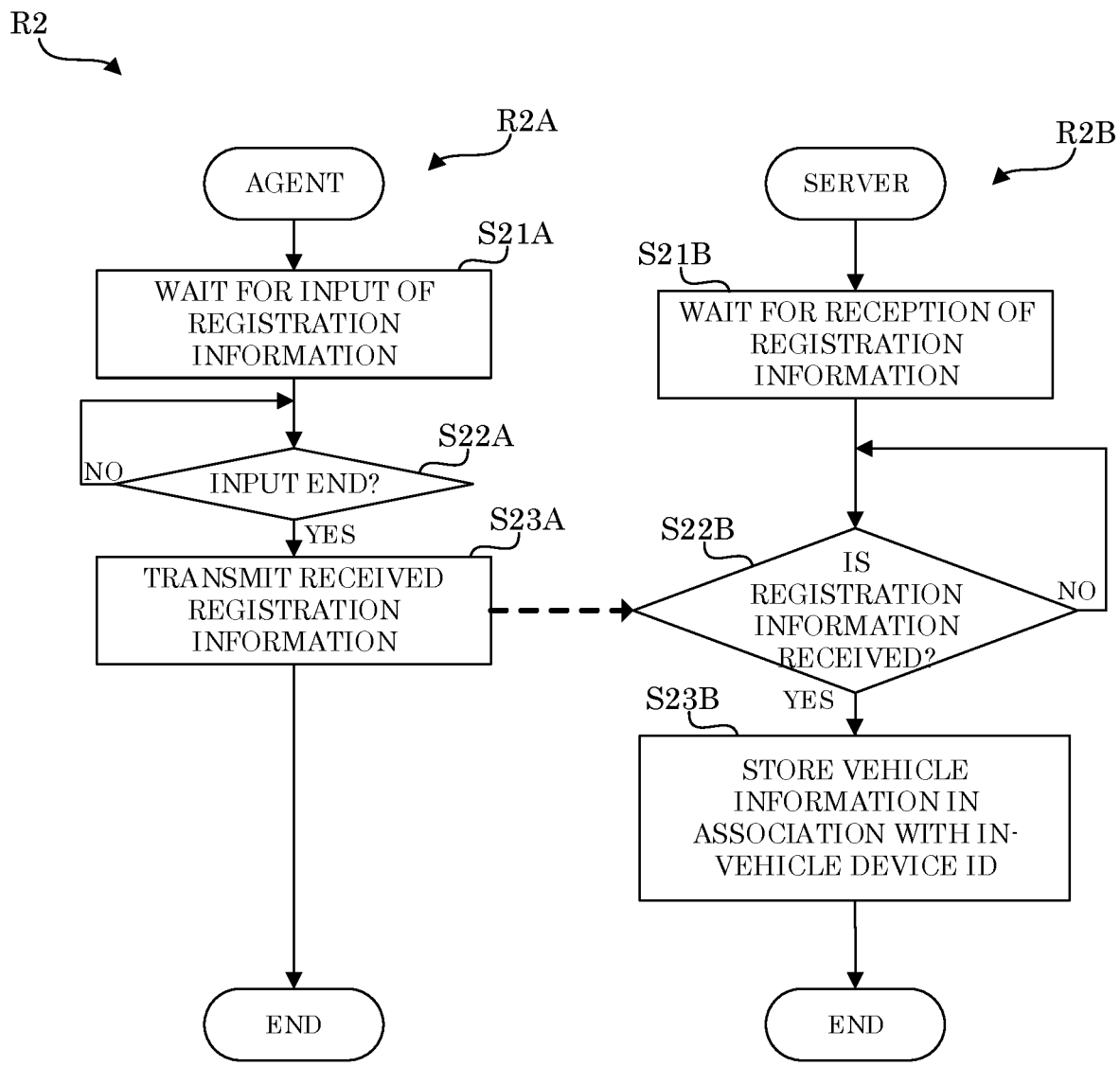
FIG. 6 is a flowchart of an operation routine for implementing a system including the agent terminal of the first embodiment of the present invention.

FIG. 6 shows an information registration subroutine R2 in the travel data recording routine R1. A routine executed by the agent terminal 10 is represented by R2A, and a routine executed by the server S is represented by R2B.

When the agent terminal 10 starts the routine R2A, the agent terminal 10 first waits for input of registration information including vehicle information and setting information (step S21A). This may be done, for example, by prompting the user to input the registration information including the vehicle information and the setting information to the user by a sound, an image and so on from the output unit 29 of the agent terminal 10, and by receiving an input via the input unit 27. In this case, instead of the input unit 27, the input may be performed via the mobile terminal MT capable of communicating with the agent terminal 10.

After the end of step S21A, it is determined whether or not the input of the registration information has been completed (step S22A). This determination may be made based on whether or not a predetermined period of time has elapsed or whether or not an intention indicating that the input of the registration information has been completed via the input unit 27 or the mobile terminal MT has been made by the user. In step S22A, when it is determined that the input has not been completed (step S22A: NO), the waiting for the input of the registration information (step S21A) is continued, and step S22A is executed again after the predetermined period of time.

The vehicle information input during step 21A and step 22A may include, other than the vehicle inspection date and the type of the vehicle which are included in the table TB1, for example, a vehicle specification, a size of the vehicle, a type of fuel used for the automobile M, a boarding capacity, and a left/right handle. In other words, in steps 21A and 22A, the control unit 25 functions as a moving body information acquisition unit.

The setting information input in steps 21A and 22A is voice setting information including at least one of a tone of voice setting and a speaking pace setting concerning a voice sound output from the output unit of the agent terminal 10 included in the table TB2. In other words, in step 21A and step 22A, the control unit 25 also functions as a voice setting information reception unit.

When it is determined in step S22A that the input has been completed (step S22A: YES), the received registration information is transmitted to the server S (step S23A), and the routine R2A is ended.

When the server S starts the routine R2B, the server S first waits for reception of the registration information from the agent terminal 10 (step S21B). Thereafter, the server S determines whether or not the registration information has been received from the agent terminal 10 (step S22B).

When it is determined in step S22B that registration information has not been received (step S22B: NO), the waiting for the reception of the registration information (step S21B) is continued, and then step S22B is executed again after a predetermined period of time.

When it is determined that the registration information is received in step S22B (step S22B: YES), the server S associates the received registration information with the in-vehicle device ID received in step S12B of the routine R1B and stores the setting information in the setting information database 45A and the vehicle information in the vehicle information database 45B (step S23B). After the execution of step S23B, the routine R2B is ended.

[2-3. Conversation Routine]

Figure 7:
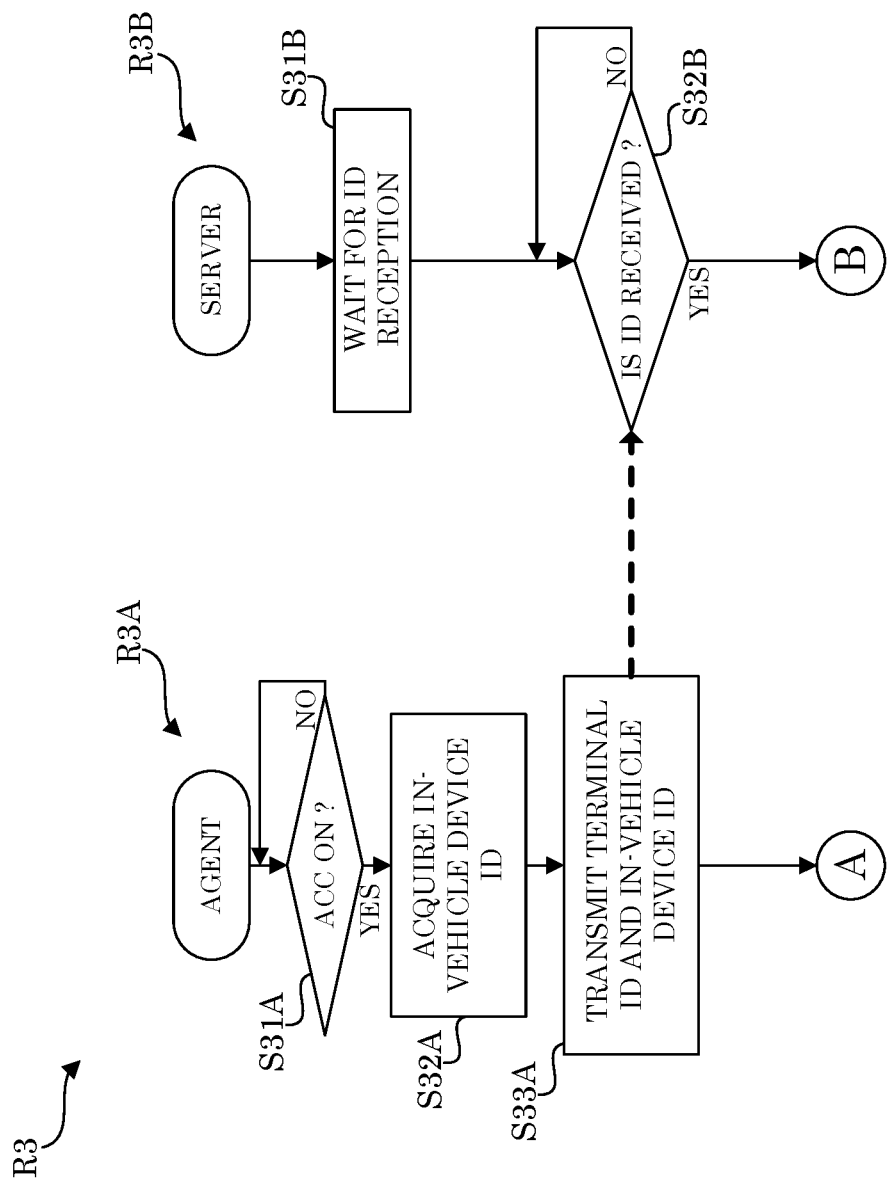
FIG. 7 is a flowchart of an operation routine for implementing a system including the agent terminal of the first embodiment of the present invention.
Figure 8:
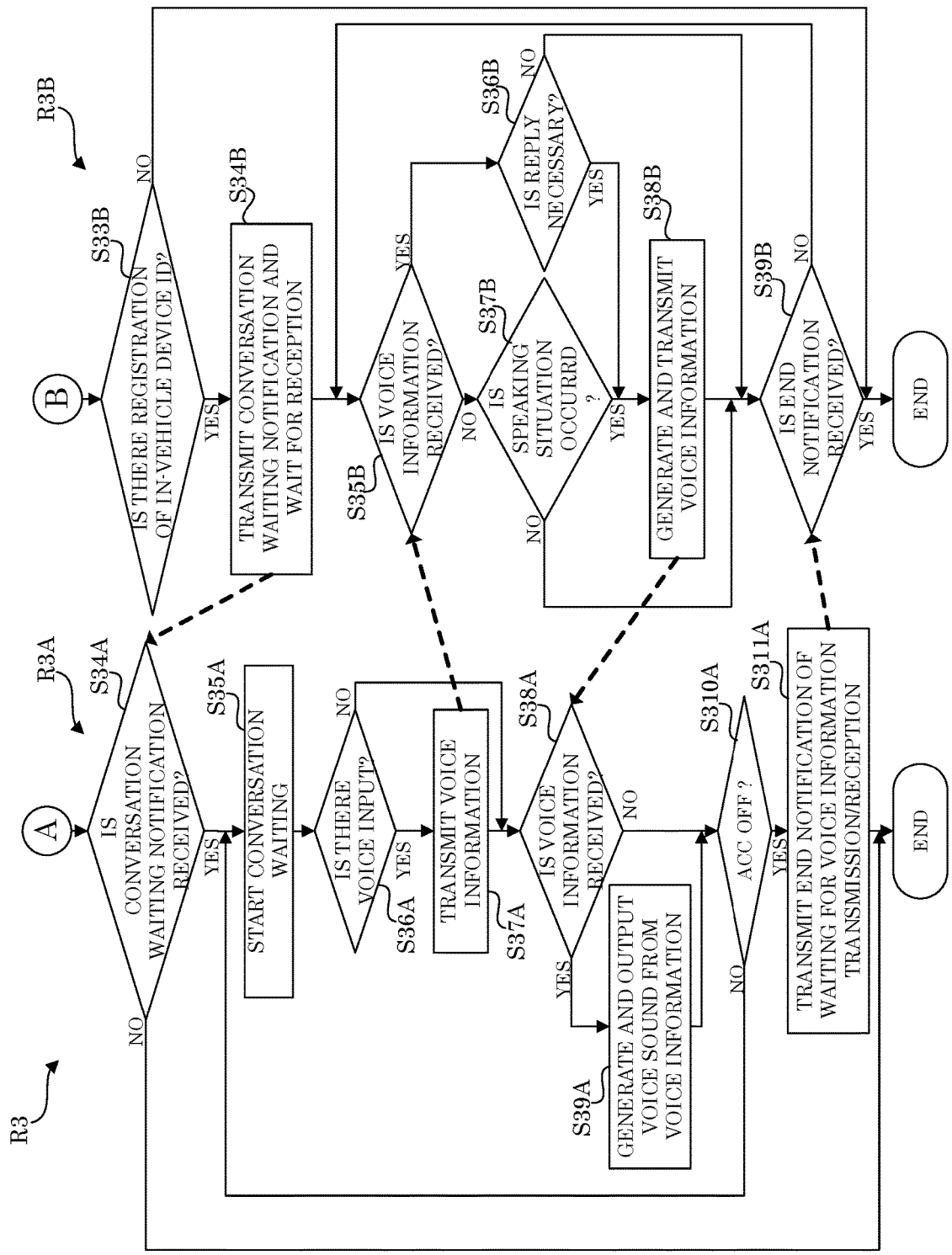
FIG. 8 is a flowchart of an operation routine for implementing a system including the agent terminal of the first embodiment of the present invention.

FIGS. 7 and 8 show a conversation routine R3 executed by the agent terminal 10 and the server S so that the server S has a conversation with the user via the agent terminal 10 when the user brings the agent terminal 10 into the automobile M, that is, when the agent terminal 10 is installed in the automobile M. A routine executed by the agent terminal 10 is represented by R3A, and a routine executed by the server S is represented by R3B.

For example, the routines R3A and R3B may be started when the agent terminal 10 and the server S are activated, and then may be repeatedly executed.

When the agent terminal 10 starts the routine R3A, it first determines whether or not the ACC power supply of the automobile M installed, in step S31A is turned on (step S31A). This determination may be made by the agent terminal 10 attempting to establish communication with the in-vehicle device VE. That is, when the communication is established, it is determined that the in-vehicle device VE is turned on, and that the ACC power supply is turned on. If the communication is not established, it is determined that the power supply of the in-vehicle device VE is not turned on, and that the ACC power supply is not turned on.

In step S31A, when it is determined that the ACC power supply is not turned on (step S31A: NO), the step S31A is executed again after a predetermined time. When it is determined in step S31A that the ACC power supply is turned on (step S31A: YES), the agent terminal 10 acquires the in-vehicle device ID of the in-vehicle device VE (step S32A). When the step S32A is finished, the terminal identifier (terminal ID) of the agent terminal 10 and the in-vehicle device ID of the in-vehicle device VE acquired in step S32A are transmitted to the server S (step S33A).

When the server S starts the routine R3B, the server S first waits for reception of the terminal ID and the in-vehicle device ID of the agent terminal 10 in step S31B (step S31B). Then, in step S32B, it is determined whether or not the terminal ID and the in-vehicle device ID transmitted in step S33A are received (step S32B).

When it is determined in step S32B that the terminal ID and the in-vehicle device ID have not been received yet (step S32B: NO), the reception of the ID is waited for a predetermined period of time, and the step S32B is executed again.

In step 32B, when it is determined that the terminal ID and the in-vehicle device ID are received (step S32B: YES), it is determined whether or not the combination of the received terminal ID and in-vehicle device ID is registered in the setting information database 45A or the vehicle information database 45B (step S33B). This determination may be made in accordance with whether or not there is a table to which the received terminal ID has been applied in the setting information table TB1 in the setting information database 45A or the vehicle information table TB2 in the vehicle information database 45B, and that the received in-vehicle device ID is described in the applied table.

In step S33B, when it is determined that the in-vehicle device VE is not registered (step S33B: NO), the routine R3B is ended. When it is determined in step S33B that the in-vehicle device VE is registered (step S33B: YES), the server S transmits a conversation waiting notification to the agent 10 to start conversation waiting (step S34B). In the conversation waiting state, the server S waits for reception of voice data from the agent terminal 10. In the conversation waiting state, the server S performs process for speech or utterance as necessary based on the travel data received by the routine R1, for example, according to a situation.

When the step S33A is ended, the agent terminal 10 determines whether or not the conversation waiting notification transmitted from the server S in the step S33B is received (step S34A). This determination can be made after the end of step 33A, that is, whether or not the conversation waiting notification has been received within a predetermined time after transmitting the terminal ID and the in-vehicle device ID to the server S.

When it is determined in step S34A that the conversation waiting notification has not been received (step S34A: NO), the agent terminal 10 determines that the registration of the in-vehicle device ID of the in-vehicle device VE is not registered in the server S, and terminates the routine R3A. As described above, the routine R3A is repeatedly executed. Therefore, during repetitive execution of the routine R3A, for example, when the information registration subroutine R2 described above is executed and the in-vehicle device ID of the in-vehicle device VE is registered, the determination in step S33B and step S34A may be changed.

When it is determined in step S34A that the conversation waiting notification has been received (step S34A: YES), the agent terminal 10 starts the conversation waiting (step S35A). In the conversation waiting state, the agent terminal 10 maintains a receiving state of an input of voice via the input unit 27 or the mobile terminal MT. In the conversation waiting state, the agent terminal 10 waits for reception of voice information from the server device S.

After entering the conversation waiting state, the agent terminal 10 determines whether or not there is a voice input via the input unit 27 or the mobile terminal MT (step S36A). When it is determined that there is a voice input in step S36A (step S36A: YES), the agent terminal 10 converts the input voice into data, and transmits the data to the server S (step S37A).

When the agent terminal 10 determines that there is no voice input in step S36A (step S36A: NO), or after executing step S37A, the agent terminal 10 determines whether or not the voice data has been received from the server S in step S38A. This determination may be made by determining whether or not voice data from the server S is received within a predetermined time after the determination in step S36A or after the execution in step S37A.

When the agent terminal 10 determines in step S38A that voice data has been received (step S38A: YES), the agent terminal 10 generates a voice sound based on the voice data, and outputs the voice sound as provision information via the output unit 29 or the mobile terminal MT (step S39A). The voice sound may be output from a built-in speaker of the agent terminal 10 or may be output from an in-vehicle device VE such as a car stereo device which is communicably connected to the agent terminal 10.

When the agent terminal 10 determines in step S38A that the voice data has not been received (step S38A: NO), or after the execution of step S39A, the agent terminal 10 determines whether or not the ACC power supply of the automobile M is turned off (step S310A). This determination may be made by the agent terminal 10 attempting to establish communication with the in-vehicle device VE. That is, when the communication is established, it is determined that the power supply of the in-vehicle device VE is turned on and that the ACC power supply is not turned off. When the communication is not established, it is determined that the power supply of the in-vehicle device VE is turned off, and that the ACC power supply is turned off.

In step S310A, when it is determined that the ACC power supply is not turned off (step S310A: NO), the conversation waiting state is maintained and the operation of step S36A is executed again.

When it is determined in step S310A that the ACC power supply is turned off (step S310A: YES), a conversation waiting end notification is transmitted to the server S (step S311A), and the routine R3A is ended.

After the server S completes the step S34B and enter or go into the conversation waiting state, the server S determines whether or not the voice data is received from the agent terminal 10 in the step S35B. When it is determined in step S35B that voice information has been received (step S35B: YES), the server S analyzes the voice data and determines whether or not a reply is necessary (step S36B).

This determination is made, for example, by whether or not the contents of the voice data are a conversation between the passengers of the automobile M. For example, if the contents of one voice are question contents, but there is another voice indicating an answer to the question immediately after the one voice, it may be determined that the contents of the voice are conversation between passengers of the automobile M, and that the reply is not necessary. Further, for example, when the contents of one voice is question contents and there is no other voice for a predetermined period of time, it may be determined that the voice is an inquiry to the server S from a passenger of the automobile M, and that the reply is necessary.

When it is determined in step S35 that the voice information is not received, the server S determines whether or not a speaking situation occurs (step S37B). This determination may be made, for example, by the travel related information transmitted from the agent 10. For example, when something unusual in the moving body M such as a dangerous driving is detected in accordance with the traveling related information, it is determined that the speaking situation has occurred. When the speaking situation occurs, advice concerning the driving operation generated on the basis of the traveling related information may be generated.

When the server S determines in step S36B that the reply is necessary (step S36B: YES), or determines in step S37B that the speaking situation has occurred (step S37B: YES), and then generates voice data and transmits it to the agent terminal 10 (step S38B).

The voice data is generated in accordance with the analysis in the determination in step S36B or in accordance with the speaking situation occurred in step S37B. The voice data may be generated in accordance with the vehicle information database 45B and the map information database 45C which are a knowledge base.

For example, the advice regarding the driving operation based on the travel related information may be generated as providing information and transmitted as voice data. The voice data is generated on the basis of at least one of the tone of voice and the speaking pace which are stored in the table TB1 in association with the in-vehicle device ID of the in-vehicle device VE.

When the server device S determines in step 36B that there is no need for the reply (step S36B), or determines in step 37B that the speaking situation has not occurred (step S37B), or when the step S38B is ended, the server device S determines whether or not the conversation waiting end notification is received from the agent terminal 10 (step S39B).

In step 39B, when it is determined that the conversation waiting end notification is not received (step S39B: NO), the conversation waiting state is maintained, and the step S35B is executed again. When it is determined in step 39B that the conversation waiting end notification has been received, the conversation waiting state is canceled, and the routine R3B is ended.

The conversation performed in the above-described conversation routine is as follows.

For example, when the user asks "When is the next vehicle inspection?" a reply is generated in the server S, and it is output from the agent terminal 10 as "AA day/BB month in this year." Further, for example, when the user asks "How many kilometers to the destination?" the server S accesses the map information database 45C to generate a reply, and the agent terminal 10 outputs "Remaining XX km."

Further, when the user instructs "Reserve the usual restaurant this Saturday night", the server S accesses the other server DS to generate a reply, and then the agent terminal 10 outputs "You can be reserved at YY o'clock. Do you want to make a reservation?"

Further, when the user asks "Where did I go to play at the end of last month?," the server S accesses the vehicle information database 45B to generate a reply, and the agent terminal 10 outputs "You went to the ZZ amusement park at the end of last month."

Further, when the user speaks the user's current feeling that "I am hungry," the server S determines what food the user likes from the history of the restaurants visited in the past. For example, if the server S determines that the favorite food is ramen, the agent terminal 10 outputs a message "There is a famous ramen restaurant one km away. Do you want to set to a stopover point?".

As described above, in the system 100 including the agent terminal 10 of the present embodiment, various pieces of information are managed in association with the in-vehicle device ID of the in-vehicle device VE which is information capable of specifying the automobile M. Therefore, the agent terminal 10 is capable of providing information based on data stored in association with the in-vehicle device ID of the automobile M in which the agent terminal 10 is installed.

Specifically, the agent terminal 10 can provide, for example, information based on a history relating to the travel of the vehicle in which the agent terminal 10 is installed, with a voice based on the settings made for the vehicle. Therefore, even when the agent terminal 10 can be installed in a plurality of different vehicles M, the agent terminal 10 appropriately provides various information to each of the vehicles M.

Second Embodiment

[1. A System Configuration and Operation]

An information providing system 100 including an agent terminal 10 as an information providing apparatus, and an information providing method which are shown as a second embodiment of the present invention will be described below with reference to the accompanying drawings. In the second embodiment, the entire configuration of the system 100 and the respective configurations of the agent terminal 10 and the server S are the same as those in the first embodiment.

FIG. 9A shows an example of a setting information table TB3 stored in the setting information database 45A. The setting information table TB3 is created for each of the agent terminals 10. The ID of an agent terminal 10 is described in the upper left of the setting information table TB3.

Unlike the setting information table TB1 of the first embodiment 1 (see FIG. 4A), in the setting information table TB3, vehicle identifiers are listed in the form of a nickname such as "Bill" and "Jennifer" in a vehicle identifier field, and each of the vehicle identifiers is set for each vehicle M.

The in-vehicle device IDs of the in-vehicle devices VE are listed in an in-vehicle device ID field. In a field of atone, a tone of voice when the agent terminal 10 is installed in the automobile M provided with the specific identifier (nickname) is described. In addition, in a field of a speaking pace, a speaking pace when the agent terminal 10 is installed in the automobile M to which the specific identifier (nickname) is given is described. In other words, in the second embodiment, the in-vehicle device ID, the tone of voice, and the speaking pace are associated with the vehicle identifier (nickname).

When the control unit 47 of the server S functions as an AI conversation robot as described in the first embodiment, a conversation voice is generated on the basis of the tone of voice and the speaking pace described in association with the vehicle identifier (nickname) in the setting information table TB3.

The information on the tone of voice and the speaking pace included in the setting information table TB3 can be set and saved by the user when the agent terminal 10 is installed in the automobile M that has not yet been registered, that is, in the automobile M in which the agent terminal 10 is installed for the first time. The contents of this setting may be input through the input unit 27 of the agent terminal 10 or through the mobile terminal MT capable of communicating with the agent terminal 10. The contents of the setting may be stored in the setting information database 45A by transmitting the input setting contents to the server S.

FIG. 9B shows an example of a vehicle information table TB4 stored in the vehicle information database 45B. Unlike the setting information table TB1 (see FIG. 4B) of the first embodiment, in the setting information table TB4, vehicle identifiers are listed in the form of a nickname such as "Bill" and "Jennifer" in a vehicle identifier field, and each of the vehicle identifiers is set for each vehicle M. The vehicle information table TB4 is created for each of the agent terminals 10. The ID of an agent terminal 10 is described on the upper left side of the vehicle information table TB4.

In the vehicle information table TB4, the device identifier of each registered in-vehicle device VE is listed in an in-vehicle device ID field. In a car model field, for example, vehicle data including vehicle information such as a model name of the automobile M in which the in-vehicle device VE is installed, maintenance inspection data including maintenance inspection information such as an inspection date of the automobile M, and travel data including a travel history of the automobile M are recorded. That is, in the second embodiment, the vehicle ID, the vehicle data, the maintenance check data, and the travel data are associated with the vehicle identifier (nickname).

The vehicle information may include, in addition to the model name of the automobile M, or instead of the model name, information such as a type of fuel used by the automobile M, a boarding capacity, a right/left handle, and a vehicle size. The maintenance and inspection information of the automobile M may include information such as an oil exchange date or a wiper replacement date.

The vehicle information contained in the vehicle information table TB4 can be input and stored by the user when the agent terminal 10 is installed in an automobile M that has not yet been registered, that is, in the automobile M in which the agent terminal 10 is installed for the first time. The vehicle information may be input through an input unit 27 of the agent terminal 10 or through a mobile terminal MT capable of communicating with the agent terminal 10. Further, the vehicle information may be stored in the vehicle information database 45B by transmitting the input vehicle information to the server S.

Further, the travel history may include a start point, an arrival point, a stopover point, a travel path of the automobile M, a travel speed, and an acceleration history of the automobile M. The information included in the travel history may be generated, for example, on the basis of the travel related information transmitted from the agent terminal 10 when the agent terminal 10 is installed in the automobile M and the map information stored in the map information database 45C. The travel data can be constantly updated while the agent terminal 10 is installed in the automobile M.

[2. A Control Routine]

A control routine for implementing a system including the agent terminal 10 and server S, and the method of the second embodiment will be described below. Since the travel data recording routine and the conversation routine are the same as those in the first embodiment, a description thereof will be omitted.

In the second embodiment, when registering information, a user inputs a vehicle identifier in addition to the registration information of the first embodiment, and is registered in the database of the server S. Then, the registration information is stored in association with the vehicle identifier (nickname).

[2-1. Information Registration Subroutine]

Figure 10:
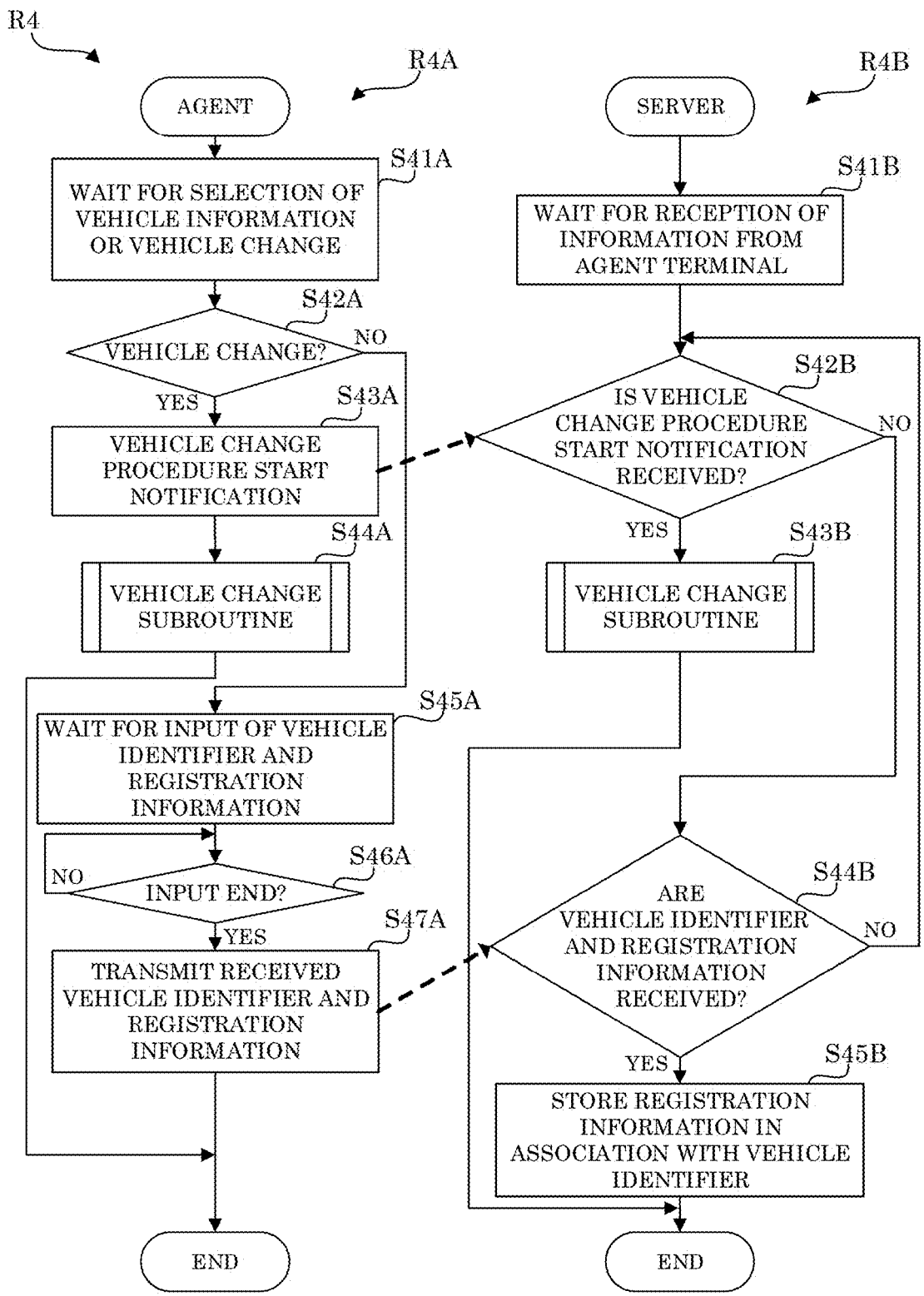
FIG. 10 is a flow chart of an operation routine for implementing a system including an agent terminal of a second embodiment of the present invention.

FIG. 10 shows an information registration subroutine R4 in the second embodiment. A routine executed by the agent terminal 10 is represented by R4A, and a routine executed by the server S is represented by R4B.

When the agent terminal 10 starts the routine R4A, the agent terminal 1 first waits for a selection of a new information registration or a vehicle change (step S41A). The vehicle change procedure is done for taking over the vehicle identifier (nickname) and information associated with the identifier to a new automobile M (in-vehicle device VE) which the user is currently using. The selection waiting in step S41A is may be done, for example, by prompting the user to selectively input one of the new information registration and the vehicle change procedure by a sound, an image and so on from the output unit 29 of the agent terminal 10, and by receiving the selection input via the input unit 27.

In the case, instead of the input unit 27, the input may be performed via the mobile terminal MT capable of communicating with the agent terminal 10.

When step S41A is completed, the agent terminal 10 determines whether or not the vehicle change is input (step S42A). The determination is made in step S41A on the basis of whether or not the vehicle change has been selected.

When the agent terminal 10 determines in step S42A that the vehicle change is input (step S42A: YES), the agent terminal 10 transmits a vehicle change procedure start notification to the server S (step S43A), and starts the vehicle change subroutine (step S44A). When the subroutine in step S44A is finished, the routine R4A is ended.

In the vehicle change subroutine, the agent terminal 10 transmits to the server S a set of one or a plurality of vehicle identifiers concerning the agent terminal 10 and vehicle information associated with each of the one or the plurality of vehicle identifiers.

Then, the user selects a vehicle identifier which is a nickname to be taken over for the new automobile M which the user is currently using, and a result of the selection is transmitted to the server S. In the server S, information specific to the automobile M (the in-vehicle device VE) which has been associated until now among the selected vehicle identifiers is deleted, and other information (vehicle information and setting information which are not specific to the automobile M) is taken over the automobile M which the user is current using, that is, in which the agent terminal 10 is currently installed.

When the agent terminal 10 determines in step S42A that the vehicle change is not selected (step S42A: NO), the agent terminal 10 starts a new information registration process, and waits for an input of a vehicle identifier and registration information (step S45A). This may be done, for example, by prompting the user to input the nickname and the registration information including the vehicle information and setting information by a sound, an image and so on from the output unit 29 of the agent terminal 10, and by receiving the input via the input unit 27. In this case, instead of the input unit 27, the input may be performed via the mobile terminal MT capable of communicating with the agent terminal 10.

That is, in step S45A, one identifier concerning the automobile M in which the agent terminal 10 is currently installed is assigned. In other words, in step S45A, the control unit 25 of the agent terminal 10 functions as an assignment receiving unit.

After the end of the step S45A, the agent terminal 10 determines whether or not the input of the vehicle identifier and the registration information has been completed (step S46A). This determination may be made on the basis of whether or not a predetermined period of time has elapsed or whether or not an intention indicating that the input of the registration information has been completed via the input unit 27 or the mobile terminal MT has been made by the user. In step S46A, when it is determined that the input has not been completed (step S46A: NO), the input of the vehicle identifier and registration information is continuously waited for (step S45A), and then the step S46A is executed again after a predetermined period of time.

When it is determined in step S46A that the input has been completed (step S46A: YES), the received vehicle identifier and registration information are transmitted to the server S (step S47A), and the routine R4A is ended.

When the server S starts the routine R4B, the server S first waits for reception of information from the agent terminal 10 (step S41B). Thereafter, the server S determines whether or not there is a reception of the vehicle change procedure start notification from the agent terminal 10 (step S42B). This determination may be made according to whether or not the vehicle change procedure start notification is received within a predetermined period of time.

In step S42B, when it is determined that the vehicle change procedure start notification is received (step S42: YES), the vehicle change subroutine is started (step S43B).

When it is determined in step S42B that the vehicle change procedure start notification has not been received (step S42B: NO), the server S starts the new information registration process and determines whether or not the vehicle identifier and the registration information have been received from the agent terminal 10 (step S44B). This determination may be made according to whether or not the vehicle identifier and the registration information are received within a predetermined period of time.

When it is determined in step S44B that the vehicle identifier and the registration information are received, the server S stores the received registration information and the in-vehicle device ID of the in-vehicle device VE currently installed in the agent terminal 10 in association with the received vehicle identifier (step S45B), and then the routine R4B is ended.

When it is determined in step S44B that the vehicle identifier and the registration information are not received, the server S temporarily stops the new information registration process and executes the step S42B again.

[2-2. Vehicle Change Subroutine].

Figure 11:
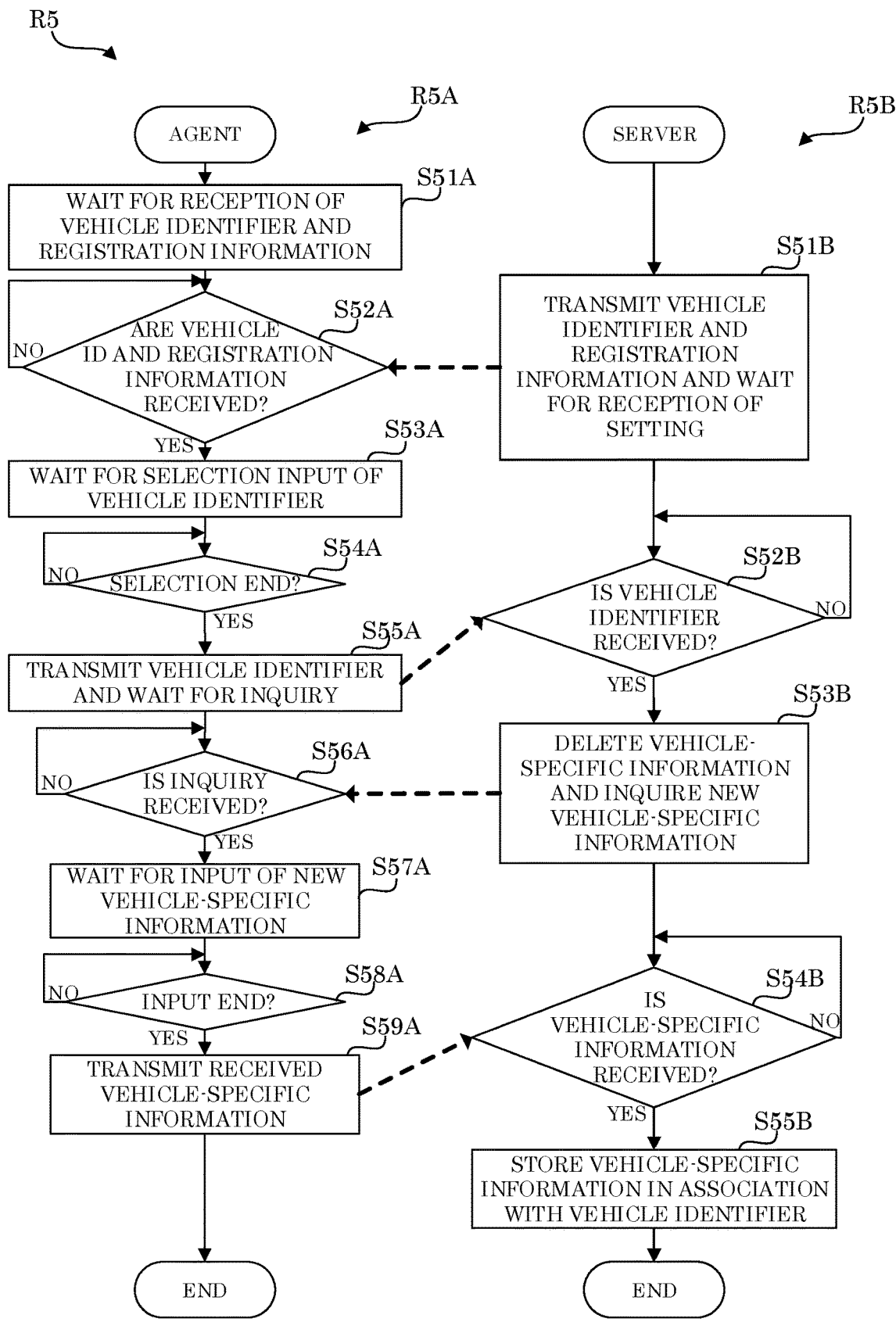
FIG. 11 is a flow chart of an operation routine for implementing the system including the agent terminal of the second embodiment of the present invention.

FIG. 11 shows a vehicle change subroutine R5 in the second embodiment. A routine executed by the agent terminal 10 is represented by R5A, and a routine executed by the server S is represented by R5B.

As described above, in the vehicle change subroutine, the agent terminal 10 transmits to the server S a set of one or a plurality of vehicle identifiers concerning the agent terminal 10 and vehicle information associated with each of the one or the plurality of vehicle identifiers. Then, the user selects a vehicle identifier which is a nickname to be taken over for the new automobile M which the user is currently using, and a result of the selection is transmitted to the server S. In the server S, information specific to the automobile M (the in-vehicle device VE) which has been associated until now with the selected vehicle identifiers is deleted, and other information (vehicle information and setting information which are not specific to the automobile M) is taken over the automobile M which the user is current using, that is, in which the agent terminal 10 is currently installed.

When the routine R5A is started, the agent terminal 10 waits for reception of a vehicle identifier and registration information associated with the vehicle identifier (step S51A).

When the routine R5B is started, the server S transmits a set of one or a plurality of vehicle identifiers and registration information included in the tables TB3 and TB4 corresponding to the terminal ID of the agent terminal 10 in the server S, and waits for reception of one vehicle identifier selected by the user in the agent terminal 10 (step S51B).

After executing the step S51A, the agent terminal 10 determines whether or not the vehicle identifier and the registration information are received (step S52A). When there is no vehicle identifier stored concerning the agent terminal 10, the fact is transmitted to the agent terminal 10. By the transmission, it is regarded that the set of the vehicle identifier and the registration information is transmitted.

When it is determined in step S52A that the vehicle identifier and so on has been received (step A52: YES), the agent terminal 10 waits for a selection input of one nickname of the received one or more vehicle identifiers (step S53A). In other words, in step S53A, the control unit 25 of the agent terminal 10 functions as an assignment receiving unit that receives a change assignment.

This may be done, for example, by prompting the user to input a vehicle identifier which is a nickname to be taken over for an unregistered automobile M which the user is currently using, by a sound, an image and so on from the output unit 29 of the agent terminal 10, and by receiving the input via the input unit 27.

In this case, instead of the input unit 27, the input may be performed via the mobile terminal MT capable of communicating with the agent terminal 10.

When it is determined in step S52A that the vehicle identifier and so on has not been received (step S52A: NO), the agent terminal 10 executes step S52A again after a predetermined period of time has elapsed.

After the end of step S53A, the agent terminal 10 determines whether or not the vehicle identifier selection input has been completed (step S54A). This determination may be made on the basis of whether or not a predetermined period of time has elapsed or whether or not an intention indicating that the input of the registration information has been completed via the input unit 27 or the mobile terminal MT has been made by the user. When it is determined in step S54A that the selection input is not finished (step S54A: NO), the waiting for the vehicle identifier selection input (step S53A) is continued, and the step S54A is executed again after the predetermined period of time.

When it is determined in step S54A that the selection input is finished (step S54A: YES), the agent terminal 10 transmits the selected vehicle identifier to the server, and waits for an inquiry from the server (step S55A).

When the server S determines in step S52B that the selected vehicle identifier is not received (step S52B: NO), the server S executes step S52B again after a predetermined period of time. When it is determined in step S52 that the selected vehicle identifier has been received (step S52B: YES), the server S deletes the vehicle-specific information specific or unique to the automobile M, which is currently registered, of the registration information associated with the selected vehicle identifier, and inquires of the agent terminal 10 about the vehicle-specific information of the newly registered automobile M (step S53B).

For example, the vehicle-specific information to be deleted includes at least one of information concerning the characteristics of the automobile M and information concerning the maintenance of the automobile M. The information concerning the characteristics of the automobile M also includes information concerning the physical properties of the automobile M. The information concerning the physical characteristics includes, for example, a vehicle specification, a vehicle size, a type of fuel used, a boarding capacity, and a right/left handle, in addition to the vehicle type. The information concerning the maintenance of the automobile M may include maintenance scheduled dates such as oil replacement, component replacement and the like of the automobile M, or a vehicle inspection date.

In addition, the information to be deleted in step S53B may include information which depends on the characteristics of the automobile M, and which is not suitable for the new automobile M. Specifically, for example, when the automobile M changes from a gasoline vehicle to an electric vehicle, or when a gas station included in the stopover point is deleted, or when the vehicle is changed from a small vehicle to a large vehicle, a large vehicle traffic prohibition road included in the route is deleted, and when the vehicle becomes high, a use history of a parking lot having the vehicle height limitation is deleted. Thus, by deleting information which is not suitable for a new vehicle, even a facility which has been frequently used can be prevented from being recommended via the agent terminal as a facility and so on used in the new automobile M.

After the end of step S55A, the agent terminal 10 determines whether or not an inquiry from the server S has been made (step S56A). When it is determined in step S56A that the inquiry is not received (step S56A: NO), the agent terminal 10 performs the step S56A again after a predetermined period of time.

When it is determined in step S56A that the inquiry is received (step S56A: YES), the agent terminal 10 waits for an input of the vehicle-specific information (step S57A). This may be done, for example, by prompting the user to input the vehicle-specific information of an unregistered automobile M which the user is currently using, by a sound, an image and so on from the output unit 29 of the agent terminal 10, and by receiving the input via the input unit 27.

In this case, instead of the input unit 27, the input may be performed via the mobile terminal MT capable of communicating with the agent terminal 10.

After the end of step S57A, the agent terminal 10 determines whether or not the vehicle identifier selection input has been completed (step S58A). This determination may be made on the basis of whether or not a predetermined period of time has elapsed or whether or not an intention indicating that the input of the registration information has been completed via the input unit 27 or the mobile terminal MT has been made by the user. In step S58A, when it is determined that the selection input is not finished (step S58A: NO), the waiting for the vehicle identifier selection input (step S57A) is continued, and the step S58A is executed again after the predetermined period of time.

The vehicle-specific information input in step S7A and step S58A may include, for example, other than a vehicle detection date and a type of vehicle included in the table TB3 described above, a vehicle specification, a vehicle size, a type of fuel used, a boarding capacity, a left/right handle, and so on. In other words, in steps 57A and 58A, the control unit 25 functions as a moving body information acquiring unit.

The setting information input in step S7A and step S8A is voice setting information including at least one of a tone of voice and a speaking pace of a voice sound output from the output unit of the agent terminal 10 included in the table TB4. In other words, in step S7A and step S8A, the control unit 25 also functions as a voice setting information receiving unit.

When it is determined in step S58A that the selection input has been completed (step S58A: YES), the agent terminal 10 transmits the input vehicle-specific information to the server S (step S59A), and the routine R5A is ended.

After the end of step S53B, the server S determines whether or not the vehicle-specific information has been received from the agent terminal 10 (step S54B). When it is determined in step S54B that the vehicle-specific information is not received (NO in step S54B), the server S executes step S54B again after a predetermined period of time. When it is determined in step S54 that the vehicle-specific information is received (step S54B: YES), the server S stores the received vehicle-specific information in association with the vehicle identifier received in step S52B, that is, the nickname selected by the user, and the routine R5B is ended (step S55B).

In the routine R5 of the second embodiment, although the vehicle-specific information which is information unique to the automobile M among the registration information associated with the vehicle identifier is deleted in step S53B, by retaining the vehicle-specific information while invalidating it, the vehicle-specific information unique to an automobile M to be newly registered may be additionally stored. In that case, the vehicle-specific information invalidated in the conversation routine R3 is not used as an information source of the conversation generation.

In the second embodiment, in the step S38B in which voice data is generated and transmitted to the agent terminal 10 in the conversation routine R3, the voice data is generated on the basis of at least one of a tone of voice and a speaking pace which are stored in association with the vehicle identifier in the table TB3.

According to the second embodiment, it is possible to assign a nickname to the vehicle by registering the vehicle identifier. Further, by storing various kinds of information in association with the vehicle identifier, it is possible to transfer the personality of a previous vehicle that has been familiar, to a newly changed vehicle.

Furthermore, according to the second embodiment, by registering the vehicle identifier in the form of a nickname, it is possible to make the user feel a vehicle as a person who is more familiar. Further, by using the registered nickname as a keyword, it is possible to more accurately determine whether a speaking is a conversation between occupants in a vehicle compartment or an utterance toward the agent terminal 10, thereby contributing to an improvement in the accuracy of the agent function.

For example, when the agent terminal 10 responds to an utterance that "I hope it will be fine tomorrow" in a conversation between occupants, the conversation may be interrupted and the conversation may be troublesome.

Therefore, in the conversation routine R3, it is determined that there is no need for a reply during a conversation in a plurality of persons. Further, it is determined that an utterance is to be directed to the agent terminal only when a nickname is included before and after an utterance such that "I hope it will be fine tomorrow, Bill," "Bill, it will be rainy tomorrow," and the like, and it is determined that a reply is required, thereby generating voice information.

Although the embodiments in which the user can assign a nickname as a vehicle identifier have been described, the vehicle identifier may be an identifier that can be freely assigned a nickname, or an identifier that can be selected by the user from a plurality of attributes such as "my car 1" and "my car 2."

In the above embodiments, the agent terminal 10 stores various kinds of information in the large-capacity storage device 45 of the external server S, but may also store a part or all of the information in a storage unit which is provided in the agent terminal.

When all of the various information stored in the server S is stored in the storage unit in the agent terminal 10, a conversational AI application program, a car navigation program, and so on may be incorporated in the agent terminal 10, and a closed system may be constructed in which connection with the server S is not performed.

In addition, in the above embodiments, in order to identify an automobile M installed, by connecting to the in-vehicle device VE, the in-vehicle device ID is acquired, but instead, by providing a camera in the agent terminal 10, the type of the automobile M in which the agent 10 is installed may be identified on the basis of an image pattern of a structure in the vehicle room captured by the camera.

In the above embodiments, the example in which the agent terminal 10 outputs the provided information by voice has been described. However, instead of or in addition to this, the provided information may be output as an image. For example, the provided information may be displayed as text on an external head-up display.

The configurations, routines, display or input modes, and the like of the agent terminal, the user terminal, the in-vehicle device, or the server in the above-described embodiments are merely examples, and can be appropriately selected or changed according to the application and so on. For example, each step in the routines may be performed by any of the server, the agent terminal, the user terminal, and the in-vehicle device regardless of the above examples.

REFERENCE SIGN LIST

100 Information providing system
10 Agent terminal
21, 41 System bus
25, 47 Control unit
23, 45 Large-capacity storage device
33 Travel information generation unit
S Server

The invention claimed is:

1. An information providing device which is transferable among a plurality of moving bodies, the information providing device comprising:
  a controller comprising a processor coupled to a memory storing instructions to permit the processor to:
    identify one moving body in which said information providing device currently exists; and
    acquire voice settings associated with said one moving body; and
  a sound output device configured to output provision information using a voice sound based on said voice settings when said one moving body is identified,
  wherein, when the information providing device is transferred into another moving body different from said one moving body, the processor newly identifies said another moving body and newly acquires voice settings associated with said another moving body, and the sound output device outputs provision information using a voice sound based on the newly acquired voice settings.

2. The information providing device according to claim 1, wherein said instructions further permit the processor to:
  acquire a travel history or maintenance inspection information in each of the plurality of moving bodies as movement related information and which is information stored in association with said each of moving bodies; and
  receive a question via a voice of a passenger of said each of moving bodies,
  wherein said sound output device outputs provision information regarding a travel history in a term designated by said question or a timing of maintenance inspection based on said question and said travel history or said maintenance inspection information associated with said one moving body when said one moving body is identified by using moving body identifying information and said provision information is linked to said each of the plurality of moving bodies, respectively.

3. The information providing device according to claim 2, wherein said travel history includes information concerning an arrival point, a stopover point, or a route when said one moving body moves.

4. The information providing device according to claim 2, wherein said movement related information includes driving operation information concerning a driving operation performed for said moving body when said the moving body moves.

5. The information providing device according to claim 4, wherein said sound output device outputs advice information including advice concerning the driving operation generated on a basis of said driving operation information.

6. A method of providing information by using an information providing device which is transferable among a plurality of moving bodies, the method comprising:
- a step of identifying by said information providing device one moving body in which said information providing device currently exists;
- a step of acquiring voice settings associated with said one moving body by said information providing device; and
- a step of outputting provision information using a voice sound by said information providing device based on said voice settings,
- wherein, when the information providing device is transferred into another moving body different from said one moving body, said another moving body is newly identified and voice settings associated with said another moving body is newly acquired and provision information using a voice sound based on the newly acquired voice settings is output.

7. A non-transitory computer readable storage medium on which an information providing program is recorded, said program being executed by an information providing device which is transferable among a plurality of moving bodies, said program comprising:
- a step of identifying by said information providing device one moving body in which said information providing device currently exists;
- a step of acquiring voice settings associated with said one moving body by said information providing device; and
- a step of outputting provision information using a voice sound by said information providing device based on said voice settings,
- wherein, when the information providing device is transferred into another moving body different from said one moving body, said another moving body is newly identified and voice settings associated with said another moving body is newly acquired and provision information using a voice sound based on the newly acquired voice settings is output.

* * * * *